United States Patent
Ogden (10) Patent No.: US 10,062,046 B2
(45) Date of Patent: Aug. 28, 2018

(54) DYNAMIC RATE MATCHING FOR MATERIAL HANDLING

(71) Applicant: Dematic Corp., Grand Rapids, MI (US)

(72) Inventor: Richard W. Ogden, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 355 days.

(21) Appl. No.: 14/830,270

(22) Filed: Aug. 19, 2015

(65) Prior Publication Data

US 2016/0052715 A1 Feb. 25, 2016

Related U.S. Application Data (60) Provisional application No. 62/039,632, filed on Aug. 20, 2014.

(51) Int. Cl.
  *G06F 7/00* (2006.01)
  *G06Q 10/08* (2012.01)
(52) U.S. Cl.
  CPC .................... *G06Q 10/08* (2013.01)
(58) Field of Classification Search
  None
  See application file for complete search history.

(56) References Cited

U.S. PATENT DOCUMENTS

| | | | |
|---|---|---|---|
| 6,374,984 B1 * | 4/2002 | Nagler | B07C 5/361 177/1 |
| 7,031,801 B1 | 4/2006 | Hodge et al. | |
| 7,801,640 B1 | 9/2010 | Hodge et al. | |
| 8,060,245 B2 | 11/2011 | Lupton et al. | |
| 8,249,917 B1 | 8/2012 | Kassmann et al. | |
| 8,713,899 B2 | 5/2014 | Hortig et al. | |
| 8,805,553 B2 * | 8/2014 | Moore | G05B 13/0255 700/281 |

(Continued)

OTHER PUBLICATIONS

Preliminary Report on Patentability of the International Searching Authority in English from corresponding Patent Cooperation Treaty (PCT) Application No. PCT/US2015/045835, completed Feb. 21, 2017.

(Continued)

*Primary Examiner* — Yolanda Renee Cumbess
(74) *Attorney, Agent, or Firm* — Gardner, Linn, Burkhart & Ondersma, LLP (57) ABSTRACT

A method and apparatus for supplying a unit of work in a material-handling process includes a set-point of work units desired at a material-processing station and an actual measure of work units at the material-processing station. A feedback control algorithm is performed to establish the set point of work units at the material-processing station and an error between the work units at the material-processing station and the set-point of work units at the material-processing station. The feedback control algorithm also determines a desired amount of units that should be supplied to the material-processing station as a function of the error. The feedback control algorithm causes a work unit to be released from the inventory store for a particular processing station when the actual amount of work units supplied to that processing station is less than the amount of work units that should be supplied to that processing station.

26 Claims, 4 Drawing Sheets (56) References Cited

U.S. PATENT DOCUMENTS

| | | | |
|---|---|---|---|
| 2007/0129843 A1* | 6/2007 | Lupton | B07C 5/36 700/223 |
| 2009/0204234 A1* | 8/2009 | Sustaeta | G05B 13/024 700/29 |
| 2011/0203231 A1* | 8/2011 | Hortig | B65B 67/02 53/473 |

OTHER PUBLICATIONS

International Search Report (Form PCT/ISA/210) and Written Opinion of the International Searching Authority (Form PCT/ISA/237) from corresponding Patent Cooperation Treaty Application No. PCT/US2015/045835, dated Nov. 24, 015.

Bhavani Shankar Earni, Control-Theoretic Dynamic Modeling and Analysis of a Production System, May 2009, Oklahoma State University, Oklahoma.

* cited by examiner

DYNAMIC RATE MATCHING FOR MATERIAL HANDLING

CROSS REFERENCE TO RELATED APPLICATION

This application claims priority from U.S. patent application Ser. No. 62/039,632, filed on Aug. 20, 2014, the disclosure of which is hereby incorporated herein by reference.

BACKGROUND OF THE INVENTION

The present invention is directed to a material-handling system and method of supplying work units in such a material-handling process. While the invention is illustrated for use in an order fulfillment system, it has other applications as well.

In a particular order fulfillment system, work units such as inventory receptacles, containing inventory items, are supplied to processing stations, such as goods-to-person stations for sorting by human operators into transport receptacles. The transport receptacles may represent individual orders or interim receptacles that are sent to further processing, such as at a put wall for organization into individual orders. The inventory receptacles are supplied under a warehouse management system from an inventory store, such as an automated warehouse system. An inventory receptacle transfer system transports the receptacles to a sorter which sorts inventory receptacles to the individual processing stations. The receptacles are allowed to accumulate at a buffer or accumulator at each processing station to allow individual operators to work at their own pace. However, when the buffer at a processing station cannot accept additional receptacles, the receptacles get recirculated in the sorter that supplies the receptacles to the processing stations. If enough receptacles are over-supplied, then the sorter gets filled with recirculation of receptacles intended for the slower operators thus preventing receptacles getting supplied to the faster operators who have an inadequate inventory receptacle at their station to process. Thus the system gets bogged down and must be operated at a slower pace to accommodate slower operators. Meanwhile the faster operators are idle.

SUMMARY OF THE INVENTION

The present invention provides a material-handling system and rate-matching process that allows the operators of processing stations to operate at a wide variety of rates without bogging down the system. In this manner, maximum throughput can be achieved under varied conditions and/or staffing makeup without needing to build additional capacity into the system.

A method and apparatus for supplying a unit of work in a material-handling process, according to an aspect of the invention, includes a set-point of work units desired at a material-processing station and an actual measure of work units at the material-processing station. A feedback control algorithm is performed to establish the set point of work units at the material-processing station and an error between the work units at the material-processing station and the set-point of work units at the material-processing station. The feedback control algorithm also determines a desired amount of units that should be supplied to the material-processing station as a function of the error. The feedback control algorithm causes a work unit to be released from the inventory store for a particular processing station when the actual number of work units supplied to that processing station is less than the number of work units that should be supplied to that processing station.

The desired amount of work units that should be supplied to the material-processing station may be the number of work units desired to be enroute to the material-processing station and the actual amount of work units supplied to that material-processing station may be the actual number of work units enroute to the material-processing station.

The set-point may be dynamically adjusted as a function of whether actual work units being supplied are outside of a particular range. The feedback control algorithm may be performed repetitively according to a particular time interval. The feedback control algorithm may combine an integral of error values for each time interval with a scaled value of each error. The integral of error values may give greater weight to positive error values than to negative error values. A positive error value is one in which the set-point of inventory receptacles at or near a processing station is greater than the actual number of inventory receptacles at or near that processing station and wherein a negative error value is one in which the actual number of inventory receptacles at or near a processing station is greater than the set-point of inventory receptacles at or near that processing station. The integral of error values may be restricted to a range of values in order to limit wind-up of the integral of error values.

A method and apparatus for supplying inventory receptacles from an inventory store to a plurality of processing stations in an order fulfillment system, according to an aspect of the invention, includes a computer system programmed to establish a set-point for each processing station of inventory receptacles desired to be at that particular station and determine an actual measure for each processing station of inventory receptacles at that processing station. The computer system is programmed to perform a feedback control algorithm for each processing station to establish the set-point for that particular processing station and an error between the inventory receptacles at that material-processing station and the set-point of inventory receptacles for that processing station. The feedback control algorithm further determines a desired number of inventory receptacles that should be enroute to the processing station as a function of the error and causes an inventory receptacle to be delivered from the inventory store for a processing station if the actual number of inventory receptacles enroute to that processing station is fewer than the desired number of inventory receptacles that should be enroute to that processing station.

The material-handling system may have a transfer system that transfers inventory receptacles from the inventory store to the processing stations and wherein the desired number of inventory receptacles that should be enroute to the processing station is also a function of operation of the transfer system.

The set-point for a processing station may be increased if the actual number of inventory receptacles at that processing station is below a minimum number and decreased for a processing station if the actual number of inventory receptacles at that processing station is above a maximum number. The increasing and decreasing may be proportional to a time base of the material-handling system. The feedback control algorithm may be a dual-loop feedback control algorithm, in which one of said dual loops controls the amount of inventory receptacles at a process station and the other one of said dual loops affects operation of the one of said dual loops as a function of overall system operation.

Each of the processing stations may have an inventory receptacle buffer and wherein the number of inventory receptacles at a processing station is a function of the number of inventory receptacles at the buffer. A sorter may be provided that receives inventory receptacles from the inventory store and delivers inventory receptacles to the processing stations. The number of inventory receptacles at a processing station is a function of the number of inventory receptacles at the sorter for that processing station.

The set-point for a processing station may be adjusted if that processing station has an actual number of inventory receptacles that is outside of a particular range. The feedback control algorithm may be repetitive according to a particular time interval. The feedback control algorithm may combine an integral of error values for each time interval and a scaled value of each error value. The integral of the error values may give greater weight to positive error values than to negative error values. A positive error value is one in which the set-point of inventory receptacles at a processing station is greater than the actual number of inventory receptacles at that processing station and a negative error value is one in which the actual number of inventory receptacles at or near a processing station is greater than the set-point of inventory receptacles at that processing station.

The integral of error values may be restricted to a range of values in order to limit wind-up of the integral of error values. The processing stations may be picking stations such as goods-to-person stations or goods-to-robot stations. The inventory store may be an automated warehouse.

These and other objects, advantages and features of this invention will become apparent upon review of the following specification in conjunction with the drawings.

DESCRIPTION OF THE PREFERRED EMBODIMENT

Figure 1:
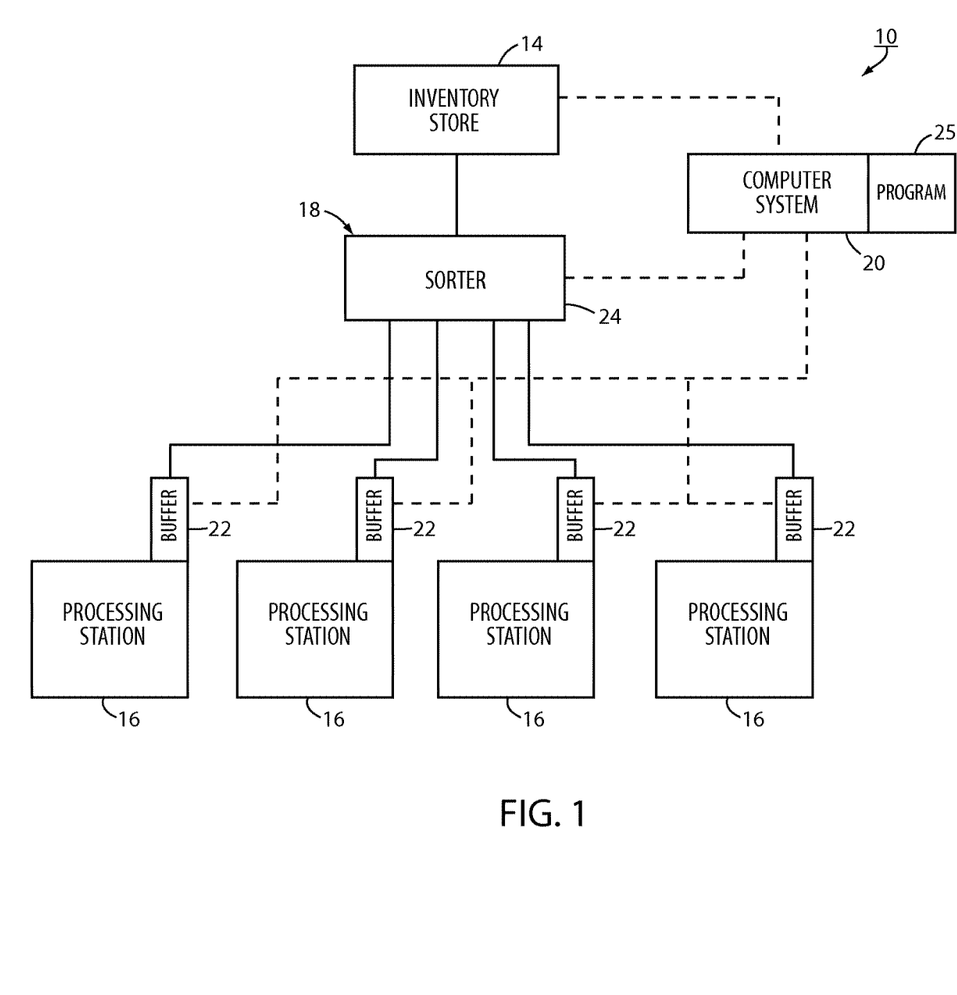
FIG. 1 is a block diagram of a material-handling system, according to an embodiment of the invention.

Referring now to the drawings and the illustrative embodiments depicted therein, a material-handling system 10 has an inventory store 14, a plurality of material-processing stations, such as picking stations 16, each operated by an operator, and a receptacle transfer system 18 for transferring inventory receptacles (not shown) from inventory store 14 to processing station 16 (FIG. 1). A computer system 20, such as a warehouse management system, has a program 25 that carries out a rate-matching method or process of supplying a unit of work from inventory store 14 to a buffer 22 of a processing station 16. Computer system 20 monitors each processing station 16 and/or receptacle transfer system 18 to instruct inventory store 14 when to release an inventory receptacle for a particular processing station 16. While the invention is illustrated for use with an order fulfillment system for delivering inventory receptacles to processing stations, such as goods-to-person pick stations, it has broad applicability to other material-handling processes in which individual units of work are paid out to individual operators.

Figure 2:
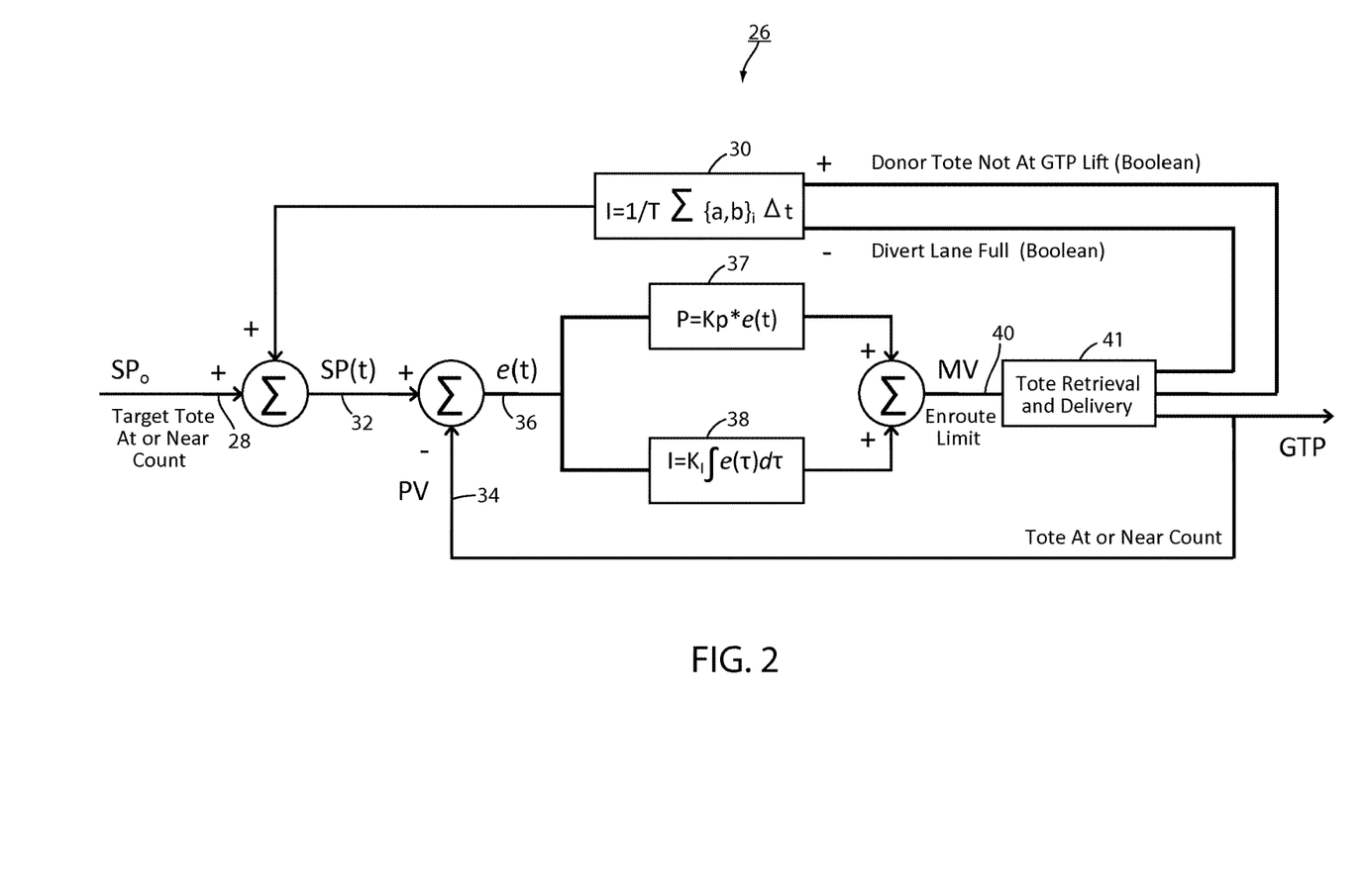
FIG. 2 is a process block diagram.

Computer system 20 runs rate-matching program 25 that carries out a feedback control algorithm 26 illustrated in FIG. 2. Feedback control algorithm 26 receives as an input, a set-point 28 that represents a number of inventory receptacles that are desired to be at or near a particular processing station 16. It should be understood that algorithm 26 is carried out with respect to each processing station 16 and a set-point that may be different for the different processing stations. The set-point of work units, such as inventory receptacles, that are desired at a material-processing station 16 may initially be set by a routine, such as by trial-and-error, or the like.

A set-point adjust process is performed at 30 in order to adjust the set-point for boundary conditions that is summed with the set-point to arrive at an adjusted set-point 32. A difference is taken between the adjusted set-point 32 and a process variable 34 which are the actual work units, such as inventory receptacles, at the particular processing station. The difference results in an error 36. A proportion of the error is carried out at 37 and an integral of the error is carried out at 38, the results of which are summed to arrive at a manipulated variable (MV) at 40. The manipulated variable is an enroute limit of a number of inventory receptacles that are to be in transfer system 18. A receptacle retrieval and delivery function 41 compares the number of receptacles currently being destined for the particular processing station with the enroute limit for that processing station. If the number of actual enroute receptacles exceeds the enroute limit, no action is taken. If the actual number of enroute receptacles is less than the enroute limit, retrieval and delivery function 41 causes inventory store 14 to output one inventory receptacle destined for the particular processing station 16 which will eventually result in an increase in the actual units at the processing station at 34.

As the operator continues to process inventory receptacles at the processing station 16, the actual units at processing station 34 will go down and additional inventory receptacles will be delivered to transfer system 18 from inventory store 14. Each processing station 16 includes a buffer or accumulator 22 which accumulates inventory receptacles for processing. The number of inventory receptacles in each buffer 22 is monitored by computer system 20 as a representation of the number of inventory receptacles that are at the processing station. Receptacles transfer system 18 includes a sorter 24, such as a cross-belt sorter, or other recirculating sorter. Any inventory receptacles on sorter 24 that are designated to be diverted to a particular processing station 16 are deemed to be near that processing station. Thus, the process variable 34 is the number of inventory receptacles that are in the buffer 22 for a processing station or on sorter 24 and destined for that processing station. The number of inventory receptacles in the buffer for a processing station is supplied to set-point adjust function 30 to adjust the set-point for two boundary conditions. If the buffer is empty, adjust function 30 increases the set-point at 32. If the buffer or the discharge lane from sorter 24 is full, adjust function 30 decreases the set-point 32. Thus, the adjusted set-point should generally result in a buffer 22 that is partially full.

Thus, the rate matching process determines an actual measure of work units at the material-processing stations using actual units 34 as the process variable (PV) and performs a feedback control algorithm 26 to establish a desired amount of work units 40 as the manipulated variable MV that should be supplied to the material-processing station as a function of an error 36 between the work units at the material-processing station and the adjusted set-point of work units 32 at the material-processing station. Retrieval and delivery function 41 compares the desired amount of work units that should be supplied to the material-processing station 40 with the actual work units being supplied to the material-processing station, as maintained in the memory of computer system 20, and supplies an additional work unit, such as an inventory receptacle, if the desired work units that should be supplied to the material-processing station are greater than the actual work units being supplied to the material processing.

Feedback control algorithm 26 is repetitively carried out according to a particular time interval T. The time interval T is a function of amount of time that work units being supplied to the material-processing station are varied. In the illustrated embodiment, that time interval is approximately every five (5) seconds but a greater or lesser amount may be used. Feedback control algorithm 26 has an integrating function 38 that performs an integral of error values for each interval of time and a proportional function 37 that obtains a scaled value of each error value. The proportional and integral values are summed to arrive at the manipulated variable 40. While feedback control algorithm 26 could also use the derivative of the error value 36, such function is not performed in the illustrated embodiment because of the length of time required for each inventory receptacle, or unit of work, to be discharged from inventory store 14 and transported to the targeted processing station 16. However, such derivative value can be used to provide a complete PID feedback control algorithm, if desired.

When the rate-matching process is applied to the supplying inventory receptacles from an inventory store 14 to a plurality of processing stations 16, set-point 28 and adjusted set-point 32 are established for each processing station 16. The set-point adjustment is scaled by a factor of 1/T where T is the time base of the delivery system. An actual measure for each processing station of inventory receptacles at or near that processing station 34 is provided as the process variable (PV) and feedback control algorithm 26 is performed repetitively to establish as the manipulated variable MV a desired number of inventory receptacles enroute in the receptacle transfer system from the inventory store 14 for each processing station 16 as a function of an error value 36 between the actual number of inventory receptacles 34 and the adjusted set-point of inventory receptacles 36 at each processing station 16. Function 41 compares the desired amount of inventory receptacles that should be enroute from the inventory store 40 with the actual number of inventory receptacles enroute for each processing station, as maintained in the memory of computer system 20, and supplying an additional inventory receptacles from inventory store 14 for a processing station 16 if the inventory receptacles that should be enroute is greater than the actual number of receptacles enroute for that processing station.

The PV for system 10 is at least the number of inventory receptacles in inventory receptacle buffer 22. In the illustrated embodiment, system 10 includes a sorter 24 that receives inventory receptacles from inventory store 14. Sorter 24 sorts the inventory receptacles according to destination and delivers inventory receptacles to the processing stations. The PV 34 for feedback control algorithm 26 includes the number of inventory receptacles near the particular processing station as a function of the number of inventory receptacles destined for the particular processing station at sorter 24. Set-point adjusting function 30 functions by adjusting the set-point for a processing station if that processing station has an actual number of inventory receptacles in buffer 22 or on sorter 24 that is outside of a particular range. For example, the set-point is reduced by function 30 if the buffer and/or the divert lane of sorter 24 is full and is increased for a processing station if the buffer 22 for that processing station is empty.

Figure 3A:
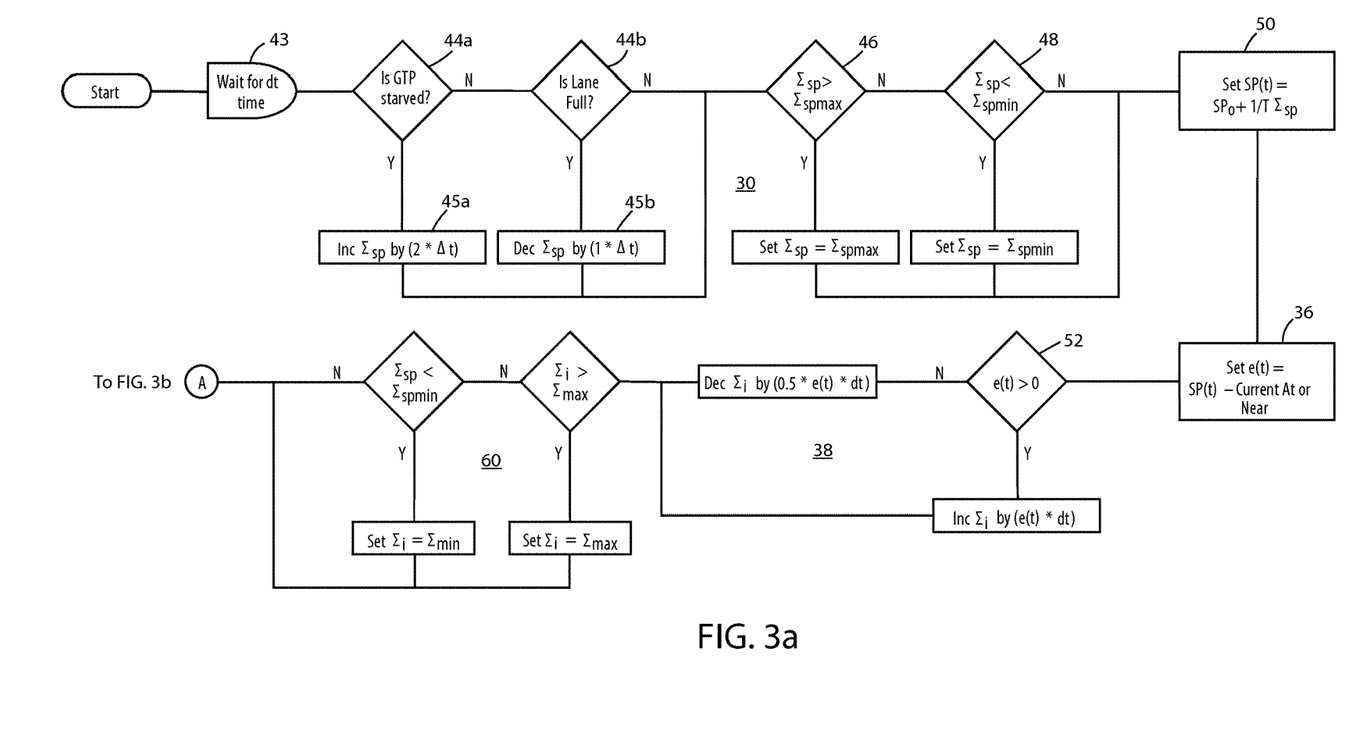
FIGS. 3a and 3b are a flow diagram of an algorithm useful in carrying out the process in FIG. 2.

Referring now to FIG. 3a, a program 25 executed by computer system 20 starts by waiting at 43 for the passage of a particular interval of time which may be a number of seconds, such as five (5) seconds or some other chosen interval. Set-point adjust function 30 is carried out by determining at 44a whether the processing station is starved because its buffer is empty. If so the set-point is adjusted by twice the time interval at 45a. If not, then it is determined at 44b whether the processing station is over-supplied because its lane from sorter 24 is full. If so, the set-point is decremented by the value of the time interval at 45b. It is then determined at 46 whether the adjustment to the set-point exceeds a maximum value and at 48 whether the adjustment to the set-point is less than a minimum value. If either is true, the adjustment set-point is set to its respective maximum or minimum value in order to keep the adjustment to the set-point within a given range. The initial set-point is adjusted at 50 by adding to or subtracting from initial set-point 28 scaled by 1/T according to the determination of set-point adjust function 30. An error value 36 is established by subtracting the process variable 34 from the adjusted set-point 32.

The integral 38 of the error value begins at 52 by determining whether the particular error value at this time interval is positive or negative. A positive error value is one in which the set-point of inventory receptacles at a processing station is greater than the actual number of inventory receptacles. A negative error value is the opposite. An integrated error value is determined by summed and adjusting the sum according to a factor that is determined at 52 whether the particular error value is positive or negative. If the particular error value is positive, then the integrated error value is increased by adding a factor equal to the present error multiplied by the time interval 43. If negative, then the integrated error is made more negative by subtracting a factor equal to the error multiplied by half the time interval 43. Thus, positive integrated errors are accentuated versus negative errors. This provides "push" to the algorithm in order to tend to move more inventory receptacles toward the operator of the processing station being considered in order to encourage the operator to work faster. The adjusted integral is then limited to a range at 60 in order to limit wind-up of the integral of error values. Integrator windup refers to a situation in a feedback controller where a large change in set-point causes an integral term to accumulate sufficient error during the windup thus overshooting.

Figure 3B:
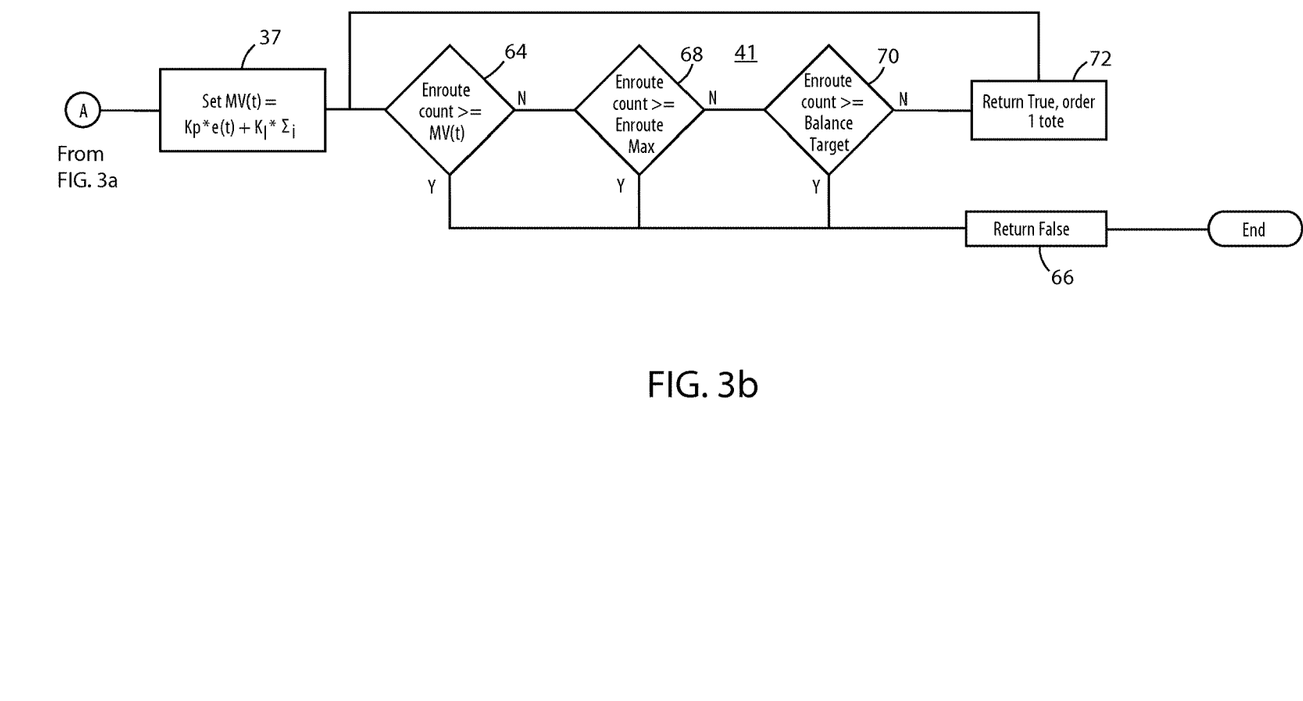

The feedback program is then continued in FIG. 3b where the proportional term is calculated at 37 by multiplying the error value by a gain factor K and adding the product to the integral value determined at 38 and 60 in order to determine the manipulated variable MV at 40. The gain factor K used in the proportion term is system dependent and relates to the time base of the system and the rate of processing of inventory receptacles at the processing stations 16. Gain factor K generally relates the number of inventory receptacles at processing stations 16 with the enroute limit of receptacles. Gain factor K may be set by using various techniques, such as a heuristic technique or by trial and error for a particular installation. Retrieval and delivery function 41 is then carried out by determining at 64 whether the enroute count of inventory receptacles for that processing station is greater than MV. If so, then no further receptacles are needed for that processing station and a false outcome is determined at 66 and no receptacles are added. If it is determined at 64 that the enroute count is greater than the MV, it is then determined at 68 whether the enroute count is greater than or equal to a maximum value and at 70 whether the enroute count is greater or equal to a balance target that is calculated to avoid overloading sorter 24. If either is true, meaning that no more inventory receptacles should be added to the receptacle transfer system 18, then false outcome 66 is also found. If, however, the enroute count is not greater than or equal to the manipulated variable MV and is less than its max value and less than the balance target, then one inventory receptacle is ordered from inventory store 14 for that processing station. A delay may be built into retrieval and delivery function 41 in order to allow the program to react to the addition of another inventory receptacle before determining if another receptacle should be ordered.

In the illustrated embodiment, each processing station 16 is a goods-to-person station of the type described in U.S. Pat. No. 8,713,899, the disclosure of which is hereby incorporated herein by reference. However, the techniques described herein can be applied to other material-handling operations. In the illustrated embodiment, inventory store 14 is an automated warehouse of the type described in U.S. Pat. No. 8,790,061. However, other types of inventory, stores such as automatic storage and retrieval systems (ASRS), and the like, can be used. In the illustrated embodiment, receptacle transfer system 18 may be a conveyor system made up of conveyors and merge units particularly where inventory store 14 is made up of multiple rack units each with a lift assembly. However, other transfer systems such as automated guided vehicles (AGV) or other types of vehicles may be used. In the illustrated embodiment, sorter 24 is a circulating sorter, such as a cross-belt, tilt-tray, or other circulating sorter, but a linear sorter with recirculation or other type of sorter may be used.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A method of supplying units of work to a material-processing station in a material-handling system, said method comprising:
   setting a set-point of work units desired at a material-processing station;
   determining an actual measure of work units at the material-processing station; and
   performing a feedback control algorithm to adjust the set-point of work units at the material-processing station and determine an error between the work units at the material-processing station and the set-point of work units at the material-processing station;
   the performing further including determining a desired amount of work units that should be supplied to the material-processing station as a function of the error and releasing a work unit from the inventory store for the material-processing station when the actual amount of work units supplied to the material-processing station is less than the amount of work units that should be supplied to the material-processing station, including performing said feedback control algorithm repetitively according to a particular time interval wherein said feedback control algorithm combines an integral of error values for each time interval with a scaled value of each error.

2. The method as claimed in claim 1 wherein the desired amount of work units that should be supplied to the material-processing station comprise the number of work units desired to be enroute to the material-processing station and the actual amount of work units supplied to that material-processing station comprises the actual number of work units enroute to the material-processing station.

3. The method as claimed in claim 1 including dynamically adjusting the set-point as a function of whether actual work units being supplied are outside of a particular range.

4. The method as claimed in claim 1 wherein the integral of error values gives greater weight to positive error values than to negative error values, wherein a positive error value is one in which the set-point of work units at or near a processing station is greater than the actual number of work units at or near that processing station and wherein a negative error value is one in which the actual number of work units at or near a processing station is greater than the set-point of work units at or near that processing station.

5. The method as claimed in claim 4 wherein the integral of error values is restricted to a range of values in order to limit wind-up of the integral of error values.

6. A method of supplying inventory receptacles from an inventory store to a plurality of processing stations in an order fulfillment system, said method comprising:
   establishing a set-point for each processing station of inventory receptacles desired to be at that processing station;
   determining an actual measure for each processing station of inventory receptacles at that processing station; and
   performing a feedback control algorithm for each processing station to adjust the set-point for that processing station and determine an error between the inventory receptacles at that processing station and the set-point of inventory receptacles for that processing station;
   said performing further determines a desired number of inventory receptacles that should be enroute to the processing station as a function of the error and causes an inventory receptacle to be delivered from the inventory store for a processing station if the actual number of inventory receptacles enroute to that processing station is fewer than the desired number of inventory receptacles that should be enroute to that processing station.

7. The method as claimed in claim 6 wherein the order fulfillment system has a transfer system that transfers inventory receptacles from the inventory store to the processing stations and wherein the desired number of inventory receptacles that should be enroute to the processing station is also a function of operation of the transfer system.

8. The method as claimed in claim 6 wherein said feedback control algorithm is a dual-loop feedback control algorithm, one of said dual loops controls the amount of inventory receptacles at a process station, the other one of said dual loops affects operation of the one of said dual loops as a function of overall system operation.

9. The method as claimed in claim 6 including a sorter that receives inventory receptacles from said inventory store and delivers inventory receptacles to said processing stations and wherein the number of inventory receptacles at a processing station is a function of the number of inventory receptacles at said sorter for that processing station.

10. The method as claimed in claim 6 including adjusting the set-point for a processing station if that processing station has an actual number of inventory receptacles that is outside of a particular range.

11. The method as claimed in claim 6 wherein said inventory store comprises an automated warehouse.

12. The method as claimed in claim 6 including increasing the set-point for a processing station if the actual number of inventory receptacles at that processing station is below a minimum number and decreasing the set-point for a processing station if the actual number of inventory receptacles at that processing station is above a maximum number.

13. The method as claimed in claim 12 wherein the increasing and decreasing is proportional to a time base of the order fulfillment system.

14. The method as claimed in claim 12 wherein each of said processing stations has an inventory receptacle buffer and wherein the number of inventory receptacles at a processing station is a function of the number of inventory receptacles at said buffer.

15. The method as claimed in claim 6 including performing said feedback control algorithm repetitively according to a particular time interval.

16. The method as claimed in claim 15 wherein said feedback control algorithm combines an integral of error values for each time interval and a scaled value of each error value.

17. The method as claimed in claim 16 wherein the integral of error values gives greater weight to positive error values than to negative error values, wherein a positive error value is one in which the set-point of inventory receptacles at a processing station is greater than the actual number of inventory receptacles at that processing station and a negative error value is one in which the actual number of inventory receptacles at or near a processing station is greater than the set-point of inventory receptacles at that processing station.

18. The method as claimed in claim 17 wherein the integral of error values is restricted to a range of values in order to limit windup of the integral of error values.

19. The method as claimed in claim 6 wherein said processing stations comprise picking stations.

20. The method as claimed in claim 19 wherein said picking stations comprise goods-to-person stations or goods-to-robot stations.

21. A material-handling system, comprising:
a material-processing station and an inventory store supplying work units to the material-processing station; and
a computer system that monitors said material-processing station and controls the inventory store to release work units from the inventory store to the material-processing station;
said computer system programmed to establish a set-point of work units desired at the material-processing station and determine an actual measure of work units at the material-processing station; and
said computer system programmed to performing a feedback control algorithm to adjust the set-point of work units at the material-processing station and determine an error between the work units at the material-processing station and the set-point of work units at the material-processing station;
said computer system further programmed to determine a desired amount of work units that should be supplied to the material-processing station as a function of the error and release a work unit from the inventory store for the material-processing station when the actual amount of work units supplied to the material-processing station is less than the amount of work units that should be supplied to the material-processing station, said computer system programmed to perform said feedback control algorithm repetitively according to a particular time interval wherein said feedback control algorithm combines an integral of error values for each time interval with a scaled value of each error.

22. An order fulfillment system, comprising:
a plurality of processing stations and an inventory store supplying inventory receptacles to said processing stations;
a computer system that monitors said processing stations and controls the inventory store to release inventory receptacles from the inventory store to individual processing stations;
said computer system programmed to establish a set-point for each processing station of inventory receptacles desired to be at that processing station;
said computer system programmed to determine an actual measure for each processing station of inventory receptacles at that processing station; and
said computer system programmed to perform a feedback control algorithm for each processing station to adjust the set-point for that processing station and determine an error between the inventory receptacles at that material-processing station and the set-point of inventory receptacles for that processing station;
said computer system programmed to determine a desired number of inventory receptacles that should be enroute to the processing station as a function of the error and cause an inventory receptacle to be delivered from the inventory store for a processing station if the actual number of inventory receptacles enroute to that processing station is fewer than the desired number of inventory receptacles that should be enroute to that processing station.

23. A method of supplying units of work to a material-processing station in a material-handling system, said method comprising:
establishing a set-point of work units desired at a material-processing station;
determining an error between an actual measure of the work units at the material-processing station and the set-point of work units desired at the material-processing station;
performing a feedback control algorithm to determine desired amount of work units that should be supplied to the material-processing station as a function of the error and releasing a work unit from the inventory store for the processing station when the actual amount of work units at the material-processing station is less than the amount of work units that should be at the material-processing station; including performing said feedback control algorithm repetitively according to a particular time interval, wherein said feedback control algorithm combines an integral of error values for each time interval with a scaled value of each error.

24. A method of supplying inventory receptacles from an inventory store to a plurality of processing stations in an order fulfillment system, said method comprising:
having a set-point for each processing station of inventory receptacles desired at that processing station;
determining an error between the inventory receptacles at that processing station and the set-point of inventory receptacles for that processing station; and performing a feedback control algorithm for each processing station to determine a desired number of inventory receptacles that should be enroute to the processing station as a function of the error and causing an inventory receptacle to be delivered from the inventory store for a processing station if the actual number of inventory receptacles enroute to that processing station is fewer than the desired number of inventory receptacles that should be enroute to that processing station.

25. A material-handling system, comprising:
a material-processing station and an inventory store for supplying work units to the processing station;
a computer system that monitors said material-processing station and controls the said inventory store to release work units from the inventory store to the material-processing station;
said computer system is programmed with a predetermined set-point of work units desired at the material-processing station and to determine an error between an actual measure of the work units at the material-processing station and the set-point of work units desired at the material-processing station; and
said computer system is programmed to perform a feedback control algorithm repetitively to determine a desired amount of work units that should be supplied to the material-processing station as a function of the error, and releases a work unit from the inventory store for the processing station when the actual amount of work units at the material-processing station is less than the amount of work units that should be at the material-processing station including performing said feedback control algorithm repetitively according to a particular time interval, wherein said feedback control algorithm combines an integral of error values for each time interval with a scaled value of each error.

26. An order fulfillment system, comprising:
a plurality of processing stations and an inventory store supplying inventory receptacles to said processing stations;
a computer system that monitors said processing stations and controls the inventory store to release inventory receptacles from the inventory to individual processing stations;
said computer system is programmed with a set-point of inventory receptacles desired for each processing station and determines an error between the inventory receptacles at a processing station and the set-point of inventory receptacles for that processing station; and
said computer system performing a feedback control algorithm for each processing station to determine a desired number of inventory receptacles that should be enroute to the processing station as a function of the error, and causes an inventory receptacle to be delivered from the inventory store for a processing station if the actual number of inventory receptacles enroute to that processing station is fewer than the desired number of inventory receptacles that should be enroute to that processing station.

* * * * *